(12) United States Patent
Fuwa et al.

(10) Patent No.: US 8,329,092 B2
(45) Date of Patent: Dec. 11, 2012

(54) METAL POWDER FOR METAL LASER-SINTERING AND METAL LASER-SINTERING PROCESS USING THE SAME

(75) Inventors: Isao Fuwa, Osaka (JP); Satoshi Abe, Osaka (JP)

(73) Assignee: Panasonic Corporation, Osaka (JP)

( * ) Notice: Subject to any disclaimer, the term of this patent is extended or adjusted under 35 U.S.C. 154(b) by 653 days.

(21) Appl. No.: 12/439,198

(22) PCT Filed: Aug. 23, 2007

(86) PCT No.: PCT/JP2007/066348
§ 371 (c)(1),
(2), (4) Date: Apr. 24, 2009

(87) PCT Pub. No.: WO2008/026500
PCT Pub. Date: Mar. 6, 2008

(65) Prior Publication Data
US 2011/0123383 A1    May 26, 2011

(30) Foreign Application Priority Data
Aug. 28, 2006 (JP) ................................ P2006-230291

(51) Int. Cl.
*B22F 3/10* (2006.01)
*B22F 1/00* (2006.01)

(52) U.S. Cl. ............... 419/11; 419/23; 419/28; 419/31; 75/252; 148/513

(58) Field of Classification Search .................. 75/252; 148/513; 419/31, 11, 23, 28
See application file for complete search history.

(56) References Cited

U.S. PATENT DOCUMENTS

| 3,744,944 A | * | 7/1973 | Chao | 425/7 |
| 3,887,402 A | * | 6/1975 | Kondo et al. | 148/513 |
| 3,954,461 A | * | 5/1976 | Chao et al. | 419/31 |
| 4,205,986 A | * | 6/1980 | Klein et al. | 419/31 |
| 5,427,600 A | * | 6/1995 | Itoh et al. | 75/232 |
| 5,777,247 A | * | 7/1998 | Garg et al. | 75/246 |
| 6,068,813 A | * | 5/2000 | Semel | 419/66 |
| 7,347,884 B2 | | 3/2008 | Unami et al. | |
| 2002/0041818 A1 | * | 4/2002 | Abe et al. | 419/7 |
| 2004/0182201 A1 | | 9/2004 | Fuwa et al. | |

FOREIGN PATENT DOCUMENTS

| JP | 2001-152204 | 6/2001 |
| JP | 2004-277877 | 10/2004 |
| JP | 2005-048234 | 2/2005 |
| JP | 2005-187908 | 7/2005 |
| JP | 2005-330573 | 12/2005 |

OTHER PUBLICATIONS

English language Abstract of JP 2005-048234.
English language Abstract of JP 2005-187908.
English language Abstract of JP 2001-152204.
English language Abstract of JP 2004-277877.

* cited by examiner

*Primary Examiner* — Roy King
*Assistant Examiner* — Ngoclan T Mai
(74) *Attorney, Agent, or Firm* — Greenblum & Bernstein, P.L.C.

(57) ABSTRACT

A metal powder for use in a metal laser-sintering wherein a three-dimensional shaped object is produced by irradiating a powder layer of the metal powder with a light beam to form a sintered layer and thereby laminating the sintered layers. The metal powder of the present invention is characterized in that it comprises an iron-based powder and at least one kind of powder selected from the group consisting of a nickel powder, a nickel-based alloy powder, a copper powder, a copper-based alloy powder and a graphite powder; and the iron-based powder has been annealed. In such metal powder, the iron-based powder is in a softened state due to the annealing treatment thereof. Accordingly, the use of the metal powder in a metal laser-sintering process makes it possible to reduce a machining resistance attributable to the residual metal powder adherent to the surface of the shaped object, which leads to an achievement of an extended lifetime of a machining tool.

5 Claims, 4 Drawing Sheets

METAL POWDER FOR METAL LASER-SINTERING AND METAL LASER-SINTERING PROCESS USING THE SAME

TECHNICAL FIELD

The present invention relates to a metal powder used in a metal laser-sintering process. More particularly, the present invention relates to the metal powder used in the metal laser-sintering process wherein a three-dimensional shaped object is produced by a light beam irradiation.

BACKGROUND OF THE INVENTION

A metal laser-sintering technology has been known as a means for manufacturing a three-dimensional shaped object wherein the shaped object is obtained by repeating steps of (1) irradiating a powder layer of a metal powder with a light beam (e.g. directional energy beam such as laser beam) to form a sintered layer and (2) providing another powder layer on the sintered layer thus formed and irradiating it with the light beam to form another sintered layer. This technology makes it possible to manufacture the three-dimensional shaped object with a complicated profile in a short period of time. Particularly when a sufficient melting of the metal powder occurs by the irradiation of the light beam with high energy density, a sintered density of almost 100% can be achieved after the solidification of the melted metal powder. The resulting object with such high density can be subsequently subject to a finish machining treatment for smoothing a surface thereof. The shaped object thus obtained can be used as a metal mold for plastic molding.

In this regard, however, the metal powder used as a raw material for such metal laser-sintering is required to have different characteristics from those of another kind of powder-sintering process in which a powder compacting followed by a sintering of the compacted powder is performed.

For example, it is required for the metal powder to have a particle diameter smaller than the thickness of the powder layer to be irradiated with the light beam. Such smaller particle diameter provides a higher packing density of the powder as well as an improved absorption efficiency of the light beam upon producing the shaped object. This will lead to a higher sintered density and a smaller surface-roughness of the shaped object. On the other hand, when the particle diameter is too small, the metal powder tends to form the aggregated particles so that a packing density of the powder becomes lower, thus making it impossible to uniformly form a thin metal layer thereof.

In order to increase the strength of the shaped object, it is required that a contact area is large and a bonding strength is high between a newly formed sintered layer and a preceding and solidified sintered layer lying thereunder. In this case, even between the newly formed sintered layer and an adjacent solidified sintered layer, there is required a large contact area and a high bonding strength.

Furthermore, it is required that a top surface of the newly formed sintered layer does not have a significant bulge. The bulge with more than the thickness of the powder layer can interfere with the spread of the subsequent powder layer, making it impossible to form such subsequent powder layer.

Upon irradiating the metal powder with the light beam, the metal powder is allowed to melt partially or wholly. The melted metal powder is then solidified by a subsequent rapid cooling thereof. This results in a formation of a sintered material. When the melted metal powder has a high wettability, the contact area between the melted metal powder and the adjacent solidified sintered layer becomes larger, in which case a higher fluidity of the melted metal powder provide a less bulge. Therefore, it is desired that the metal powder, when melted, has not only a high fluidity but also a high wettability.

There is a possibility that the three-dimensional shaped object produced by the metal laser-sintering process has the residual metal powder adherent to the surface thereof, resulting in a rough surface of the object. Thus, in a case where the three-dimensional shaped object is used as a metal mold for plastic injection molding in which a high accuracy is required, such residual metal powder must be removed by carrying out a finish machining with a machining tool or the like. When the metal laser-sintering process is carried out by using a metal powder containing an iron-based powder with high hardness, the edge of the machining tool may wear out due to the hardness of the iron-based powder during the machining operation. Particularly when a narrow groove of the object is machined, it is required to use a machining tool having smaller diameter that is more prone to wear out and may undergo a chipping or breakage. Therefore, it is desired to use a metal powder which makes for a better machinability during the finish-machining operation and the like.

The three-dimensional shaped object thus obtained must have no significant crack on the outer surface thereof. In particular in a case where the three-dimensional shaped object is used as a metal mold for injection molding, it is desired that there is no micro crack in the inner structure of the object, considering that a flowing fluid is passed therethrough as a coolant.

In the light of the above, the applicant of the present invention has proposed a metal powder for metal laser-sintering comprising an iron-based powder (chromium-molybdenum steel powder, alloy tool steel powder) and at least one kind of nonferrous powder selected from the group consisting of nickel, nickel-based alloy, copper and copper-based alloy, as disclosed in Japanese Unexamined Patent Publication (Kokai) No. 2001-152204. The applicant of the present invention also has proposed a powder mixture for metal laser-sintering comprising an iron-based powder (chromium-molybdenum steel), at least one of nickel powder and nickel-based alloy powder, at least one of copper powder and copper-based alloy powder and graphite powder, as disclosed in Japanese Unexamined Patent Publication (Kokai) No. 2004-277877. The chromium-molybdenum steel and the like are used for the reason of strength and toughness. The copper and copper-based alloy powders are used for the reason of wettability and fluidity. The nickel and nickel-based alloy powders are used for the reason of strength and machinability. The graphite powder is used for the reason of the reduction in the absorbing rate of the light beam and micro cracks.

However, even the metal powders for metal laser-sintering described in Japanese Unexamined Patent Publications (Kokai) Nos. 2001-152204 and 2004-277877 have such problem that the hard iron-based powder adherent to the surface of the shaped object produced by the metal laser-sintering process causes a machinability resistance to be increased upon the finish machining of the surface, which leads to a short lifetime of the machining tool. On the other hand, a slower machining rate is required for extending the lifetime of the tool, resulting in an increase of the necessary time for machining operation.

DISCLOSURE OF THE INVENTION

Problems to be Solved by the Invention

The present invention is directed to solve the above problem. In other words, an object of the present invention is to provide a metal powder for metal laser-sintering, making it possible to reduce a machining resistance that is provided upon the removing operation of the residual metal powder adherent to the surface of the shaped object, thereby extending the lifetime of the machining tool.

Means for Solving the Problems

In order to achieve the above object, the present invention provides a metal powder for use in metal laser-sintering wherein a three-dimensional shaped object is produced by irradiating a powder layer of the metal powder with a light beam to form a sintered layer, and thereby laminating the sintered layers; characterized in that the metal powder comprises an iron-based powder and at least one kind of powder selected from the group consisting of a nickel powder, a nickel-based alloy powder, a copper powder, a copper-based alloy powder and a graphite powder; and the iron-based powder has been annealed. The metal powder for use in metal laser-sintering according to the present invention is characterized in that the iron-based powder has been annealed so that it is in a softened state. As used in this description and claims, the term "annealed (annealing)" generally refers to a treatment of heating an iron-based powder to a certain level of temperature and then allowing it to stand at this temperature for a proper period of time, followed by cooling down (preferably a slow cooling thereof). Such term "annealed (annealing)" is called "SYOUDON" or "YAKINAMASHI" in Japanese.

In the metal powder for metal laser-sintering of the present invention, it is preferable that the iron-based powder and at least one kind of powder selected from the group consisting of the nickel powder, the nickel-based alloy powder, the copper powder, the copper-based alloy powder and the graphite powder have been mixed with each other (and more preferably they are homogeneously mixed with each other). Preferably, the metal powder for metal laser-sintering of the present invention comprises the iron-based powder; at least one of the nickel powder and the nickel-based alloy powder; at least one of the copper powder and the copper-based alloy powder; and the graphite powder.

In one preferred embodiment, the iron-based powder has been annealed by allowing it to stand at a temperature of from 600 to 700° C. under a reduced pressure, a vacuum or an inert atmosphere, followed by a cooling or a slow cooling thereof. It is preferable in this case that a mean particle diameter of the iron-based powder is in the range of from 5 to 50 µm.

An iron-based powder to be annealed may be an atomized powder (i.e. sprayed powder). In other words, the iron-based powder to be annealed may be a powder that is prepared by an atomization process (for example, water atomization process).

The present invention also provides a metal laser-sintering process wherein the above-mentioned metal powder for metal laser-sintering is used. This present invention is a process for producing a three-dimensional shaped object by repeating the step of irradiating a powder layer of the above metal powder with a light beam to form a sintered layer; and the step of machining a surface portion of the laminated sintered layers and/or removing an unnecessary portion of the laminated sintered layers.

Effect of the Invention

In the metal powder for metal laser-sintering of the present invention, the iron-based powder is in a soften state due to the annealing treatment thereof. This softness can reduce a machining resistance which is attributable to the residual metal powder adherent to the surface of the shaped object obtained by the metal laser-sintering. In other words, the machining resistance upon removing an unnecessary metal powder attached to the surface of the shaped object by machining the surface thereof can be reduced, which leads to an achievement of the lifetime extension of the machining tool that is used for such removing. The phrase "machining tool" used herein means a machining tool commonly used for the metal laser-sintering process.

Particularly in a case where the metal powder comprises the iron-based powder; at least one of the nickel powder and the nickel-based alloy powder; at least one of the copper powder and the copper-based alloy powder; and the graphite powder, a high sintered-density of the three-dimensional shaped object can be achieved.

In a case where the iron-based powder (preferably having a mean particle diameter of from 5 to 50 µm) has been annealed by allowing it to stand at a temperature of from 600 to 700° C. under a reduced pressure, a vacuum or an inert atmosphere, followed by a cooling or a slow cooling thereof, the iron-based powder has not undergone a fusing of the particles during the annealing treatment and thus can be particularly suitable for the metal powder for use in metal laser-sintering.

In accordance with the present invention, even in a case where an atomized powder having a relatively high hardness is used as the iron-based powder, such powder has been annealed so that it is in a softened state. Consequently, the softened state of the atomized iron-based powder can reduce the machining resistance that is attributable to the residual metal powder adherent to the surface of the shaped object obtained by the metal laser-sintering. In other words, in a case where the atomized powder having a relatively high hardness is used as a raw material for the metal laser-sintering, it is possible to extend the lifetime (service time) of the machining tool which is used for removing an unnecessary metal powder adherent to the surface of the shaped object.

Figure 1:
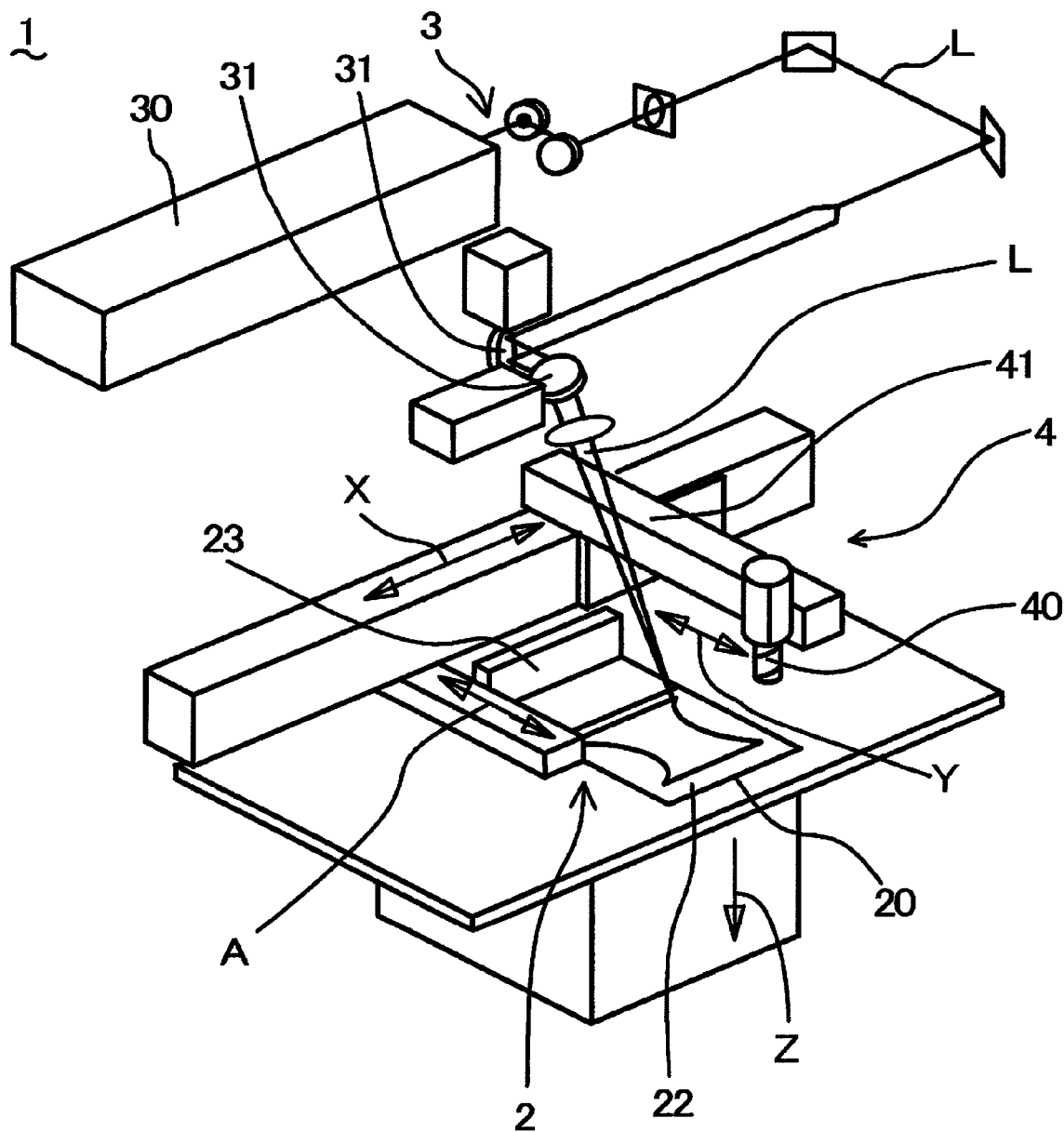
FIG. 1 is a configuration diagram of a metal laser-sintering/milling hybrid machine wherein a metal powder for metal laser-sintering according to the present invention is used.

In the drawings, reference numerals correspond to the following elements:
1 Metal laser-sintering/milling hybrid machine
2 Powder layer forming means 3 Sintered layer forming means
4 Removing means
20 Elevating/descending table
21 Base plate for shaped object
22 Powder layer
23 Squeegee blade
24 Sintered layer
30 Light beam generator
31 Galvanometer mirror
40 Milling head
41 X-Y actuator
L Light beam

BEST MODES FOR CARRYING OUT THE
INVENTION

The present invention will now be described in more detail with reference to the accompanying drawings. First, a metal laser-sintering/milling hybrid process in which a metal powder of the present invention is used will be described. Following this, the metal powder for use in such metal laser-sintering process will be described according to the present invention.

(Metal Laser-Sintering/Milling Hybrid Process Wherein Metal Powder for Metal Laser-Sintering is Used)

Referring to FIG. 1, the metal laser-sintering/milling hybrid process in which a metal laser-sintering is performed with the use of a suitable metal powder will be described. FIG. 1 shows a configuration of a metal laser-sintering/milling hybrid machine 1 for performing both of a metal laser-sintering process and a milling process (machining process). The metal laser-sintering/milling hybrid machine 1 comprises a powder layer forming means 2 for providing a layer of a metal powder with a predetermined thickness, a sintered layer forming means 3 for irradiating a desired region with an emitted light beam L, a removing means 4 for machining a periphery of a shaped object thus obtained. The powder layer forming means 2 comprises an elevating/descending table 20 capable of moving vertically, a base plate (see FIG. 3) that is located on the table 20 and thus provides a platform for the shaped object, and a squeegee blade 23 for spreading the metal powder to form a powder layer 22 of the powder on the base plate. The sintered layer forming means 3 comprises a light beam generator 30 for emitting a light beam L (an energetic beam having directivity characteristic, e.g. laser), and a Galvanometer mirror 31 for scanning the light beam L onto the powder layer 22. The removing means 4 comprises a milling head 40 capable of machining the periphery of the shaped object, and a X-Y actuator 41 for driving the milling head 40 to move toward a desired region to be machined.

Figure 2:
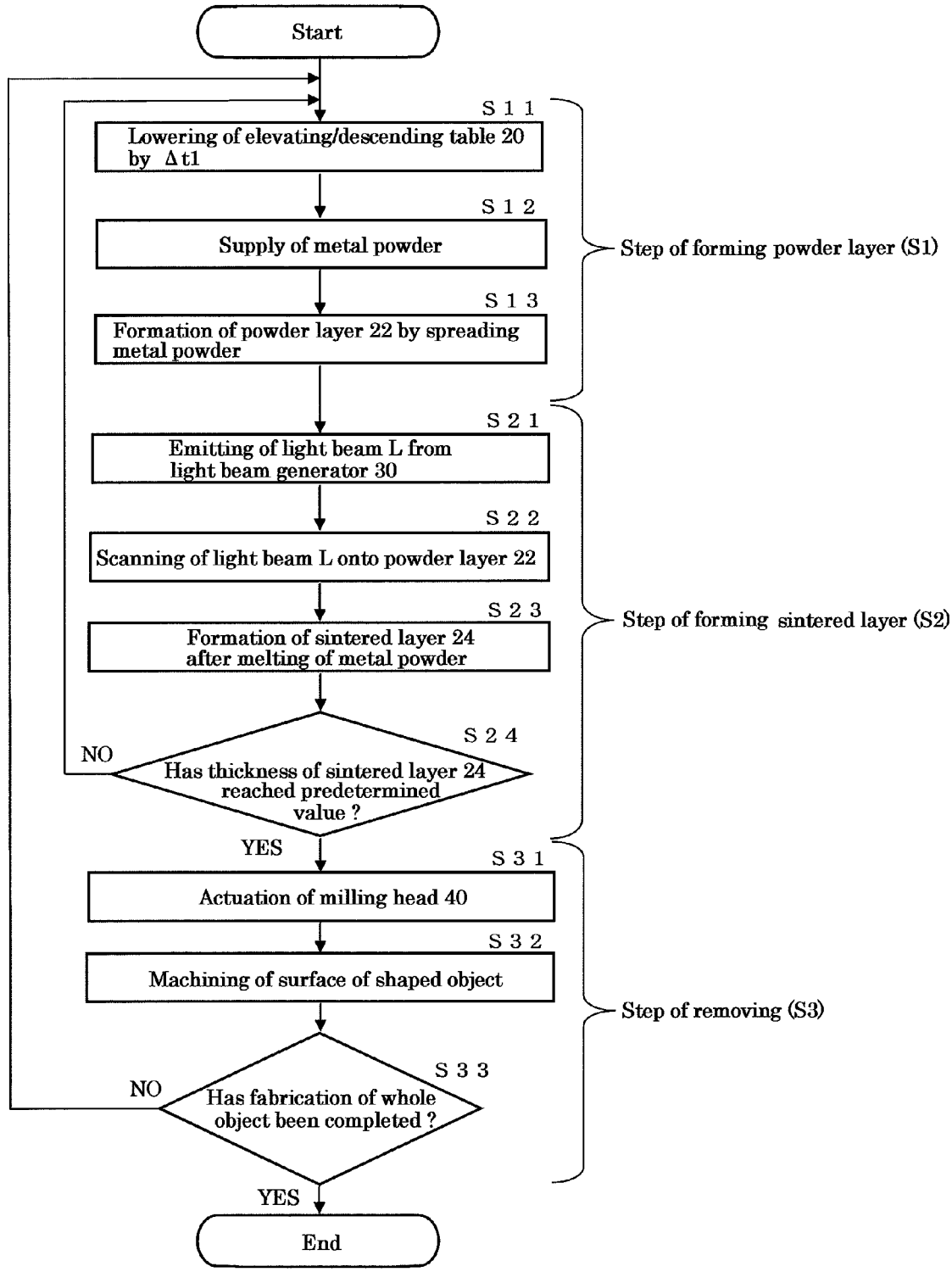
FIG. 2 is a flowchart of operations associated with a metal laser-sintering/milling hybrid machine (i.e. metal laser-sintering process according to the present invention).
Figure 3:
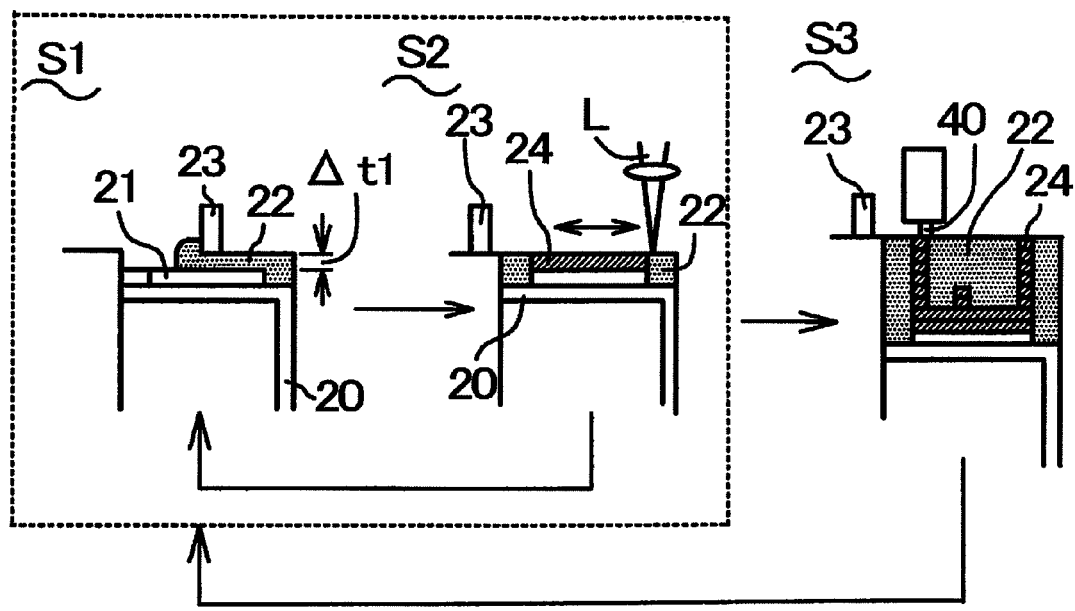
FIG. 3 is an illustration showing a performed operation of a metal laser-sintering/milling hybrid machine.

Turning now to FIGS. 2 and 3, an operation of the metal laser-sintering/milling hybrid machine 1 will be described. FIG. 2 shows the sequential steps associated with the metal laser-sintering/milling hybrid machine 1. FIG. 3 illustrates the performed operations of the metal laser-sintering/milling hybrid machine 1.

The operations associated with the metal laser-sintering/milling hybrid machine 1 are composed of a powder layer forming step (S1) for spreading the metal powder and forming a layer thereof, a sintered layer forming step (S2) for irradiating the powder layer 22 with the light beam L, thereby forming the sintered layer 24 and a removing step (S3) for machining the surface of the shaped object thus obtained (i.e. laminated sintered layers). In the powder layer forming step (S1), first the elevating/descending table 20 is lowered by $\Delta t1$ in the direction of arrow Z (S11). Then, the metal powder is disposed onto the base plate 21 (S12), and subsequently the squeegee blade 23 is driven to move in the direction of arrow A to level the disposed metal powder over the base plate 21. As a result, the powder layer 22 with a predetermined thickness $\Delta t1$ is formed (S13). Following this, the sintered layer forming step (S2) is performed. In this sintered layer forming step, the light beam L is emitted from the light beam generator 30 (S21) and then is scanned onto a desired region of the powder layer 22 by means of the Galvanometer mirror 31 (S22). The scanned light beam can cause the metal powder to be melted and sintered, resulting in a formation of the sintered layer 24 integrated with the base plate 21 (S23).

The powder layer forming step (S1) and the sintered layer forming step (S2) are repeatedly performed until some sintered layers 24 are laminated so that the thickness of the laminated layers reaches a predetermined value that is obtained based on, for example, a tool length of the milling head 40.

When the thickness of the laminated sintered layer 24 reaches the predetermined value, the milling head 40 is actuated (S31) to perform the removing step (S3). Specifically, the milling head 40 is actuated in X and Y directions by means of the X-Y actuator 41, and the actuated milling head 40 machines the surface of the shaped object wherein some sintered layers 24 are laminated on each other (S32). When the whole of the three-dimensional shaped object has not yet been produced, the operation returns to the powder layer forming step (S1). In this way, the steps S1 through S3 are repeatedly performed to form a further lamination of the sintered layers 24, which finally leads to a fabrication of the desired three-dimensional shaped object.

A scanning path of the light beam L and a machining path, which are respectively used in the sintered layer forming step (S2) and the removal step (S3), are determined in advance by using a 3-D CAD data. In this case, the machining path is determined on the assumption of a contour machining. In connection with the machining operations, the thickness of the sintered layer 24, which is a factor for controlling a commencing time of the removing step (S3), varies depending on each individual shape of the object to be produced. Specifically, in a case where the shaped object has a sloped periphery therein, the removing step (S3) commences before the thickness of the sintered layer reaches the predetermined thickness, which will lead to an achievement of a smooth surface of the shaped object.

(Metal Powder for Use in Metal Laser-Sintering)

Now the metal powder for metal laser-sintering will be described in accordance with the present invention. The metal powder for metal laser-sintering according to the present invention comprises an iron-based powder and at least one kind of powder selected from the group consisting of nickel powder, nickel-based alloy powder, copper powder, copper-based alloy powder and graphite powder.

Examples of the iron-based powder include, but are not limited to, chromium-molybdenum steel powder, carbon tool steel powder, die steel powder (dies steel powder), high-speed tool steel powder and the like. As for the iron-based powder with a high carbon content, the structure thereof turns into martensite having a high hardness when quenched, but such hardness decreases when tempered. In a case where the iron-based powder is the chromium-molybdenum steel powder or tool steel powder, not only the surface of the shaped object can be easily machined, but also the shaped object with high strength and high hardness can be obtained. The particle shape of the iron-based powder may be sphere, oval or polyhedron (e.g. cube), but the present invention is not limited to that. Mean particle diameter of the iron-based powder is preferably in the range of from 2 to 100 μm, more preferably in the range of from 5 to 50 μm and still more preferably in the range of from 10 to 30 µm. As an additional remark, the iron-based powder with mean particle diameter of less than 5 µm tends to form the aggregated particles. Moreover, the thickness of the powder layer formed by the metal laser-sintering is usually about 50 µm. As used in this description and claims, the phrase "particle diameter" substantially means a maximum length among lengths in all directions of each particle, in which case the phrase "mean particle diameter" substantially means a particle size calculated as a number average by measuring each diameter of a certain number of particles, based on an electron micrograph or optical micrograph of the particles.

As will be described in detail later, the iron-based powder is in a softened state due to the annealing treatment thereof. Thus, the iron-based powder to be annealed may be an atomized powder with a relatively high degree of hardness. Such powder can be prepared by an atomization process (for example, water atomization process).

"Nickel-based alloy" as used in "at least one kind of powder selected from the group consisting of nickel powder, nickel-based alloy powder, copper powder, copper-based alloy powder and graphite powder" may be an alloy of nickel and at least one kind of metal selected from the group consisting of silicon, boron and molybdenum, but the present invention is not limited to that. Similarly, "copper-based alloy" may be an alloy of copper and at least one kind of metal selected from the group consisting of manganese, phosphorus and tin, but the present invention is not limited to that. Similarly to the case of the iron-based powder, each particle shape of such powders may be sphere, oval or polyhedron (e.g. cube), but the present invention is not limited to that. Similarly, the mean particle diameter of the nickel powder, nickel-based alloy powder, copper powder, copper-based alloy powder and/or graphite powder is preferably in the range of from 2 to 100 µm, more preferably in the range of from 5 to 50 µm, and still more preferably in the range of from 10 to 30 µm. The phrase "particle diameter" used regarding the above powders substantially means a maximum length among lengths in all directions of each particle, and the phrase "mean particle diameter" used regarding the above powders substantially means a particle size calculated as a number average by measuring each diameter of a certain number of particles, based on an electron micrograph or optical micrograph of the particles.

There is no limit on the method of preparing "iron-based powder" and "at least one kind of powder selected from the group consisting of nickel powder, nickel-based alloy powder, copper powder, copper-based alloy powder and graphite powder". Thus, a conventional process for preparing a powder may be employed. For example, an atomization process (e.g. gas atomization process, a water atomization process, a centrifugal atomization process, a plasma atomization process), a rotating electrode process (REP), a mechanical process (e.g. crushing, grinding and/or milling process, mechanical alloying process) or a chemical process (e.g. oxide reducing process, chloride reducing process) may be employed. As will be understood, a commercially available powder that has been already prepared by the above process may be used.

There is no particular limit on the proportion of the constituent powders (i.e. blending ratio of the constituent powders) in the metal powder according of the present invention. The reason for this is that an improved machinability for the surface of the shaped object, which is attributable to the annealing treatment, is not subject to the proportion of the constituent powders. Just as an example, however, the proportion of "iron-based powder" may be in the range of preferably from 40 to 95% by weight, and more preferably 60 to 90% by weigh, based on the metal powder for metal laser-sintering. While on the other hand, the proportion of "at least one kind of powder selected from the group consisting of nickel powder, nickel-based alloy powder, copper powder, copper-based alloy powder and graphite powder" may be in the range of preferably from 5 to 60% by weight, and more preferably 10 to 40% by weigh, based on the metal powder for metal laser-sintering.

According to the metal powder of the present invention, the combination (i.e. mixture) of "iron-based powder" and "at least one kind of powder selected from the group consisting of nickel powder, nickel-based alloy powder, copper powder, copper-based alloy powder and graphite powder" provides the shaped object with not only an improved surface machinability but also an improved strength. Particularly in a case where "at least one kind of powder selected from the group consisting of nickel powder, nickel-based alloy powder, copper powder, copper-based alloy powder and graphite powder" is "at least one of the nickel powder and the nickel-based alloy powder, at least one of the copper powder and the copper-based alloy powder and the graphite powder", it additionally provides the shaped object with a high density. In this regard, for example in a case where the blending proportion of "iron-based powder" is in the range of from 60 to 90% by weight, the blending proportion of "at least one of the nickel powder and the nickel-based alloy powder" is in the range of from 5 to 35% by weight, the blending proportion of "at least one of the copper powder and the copper-based alloy powder" is in the range of from 5 to 15% by weight, and the blending proportion of "graphite powder" is in the range of from 0.2 to 0.8% by weight, it provides the shaped object with no microcrack inside thereof as well as the improved surface machinability.

In accordance with the present invention, the iron-based powder has been annealed. In other words, the iron-based powder to be used in the present invention is heated to a certain temperature and then is allowed to stand at this temperature for a proper period of time, followed by cooling down (preferably a slow cooling thereof). This annealing treatment causes the iron-based powder to be softened, making it possible to reduce the machining resistance that is attributable to the residual metal powder adherent to the surface of the shaped object. As a result, the surface machinability is improved so that a lifetime of the machining tool (for example, a milling tool made of a material such as hardmetal (cemented carbide), high-speed tool steel and/or cBN) is extended. For example, the use of the annealed iron-based powder can extend the lifetime of the machining tool by about 1.2 to 2.0 times (e.g. about 1.5 times) compared to that of no-annealed iron based powder. As to the annealing treatment, a heating temperature is in the range of preferably from 580 to 780° C., more preferably from 590 to 740° C. and still more preferably from 600 to 700° C. After such heating temperature is achieved, the iron-based powder is allowed to stand preferably for 0.5 to 10 hours, more preferably for 1 to 2 hours. In this regard, when the powder is subject to heating in a longer time period, an overheating followed by the sintering of the powder tends to occur so that the powder is solidified. While on the other hand, a shorter time period of the heating can not achieve a satisfactory annealing treatment. Upon the cooling down or slow cooling, the heated iron-based powder (i.e. iron-based powder that has been heated to the above temperature) is cooled to about 25° C. by gradual degrees. Such cooling-down or slow cooling is performed preferably by allowing the powder to stand without heating. It is preferable that the annealing treatment is carried out under a reduced pressure, a vacuum or an inert atmosphere. As used in this specification and claims, the phrase "under a reduced pressure" substantially means an atmosphere with a pressure lower than the atmospheric pressure. The phrase "under a vacuum" means an atmosphere that can be regarded as substantially vacuum atmosphere, or an atmosphere that can be created by means of a conventional vacuum device (for example, atmosphere with pressure of about 100 Pa). Moreover, as for the phrase "under an inert atmosphere", it is preferably interpreted as "under an argon gas atmosphere" or "under a nitrogen gas atmosphere", but the present invention is not limited to that. It is, of course, possible to combine the above atmospheres with each other, and in this regard the annealing treatment may be carried out under a reduced inert gas atmosphere.

Although a few exemplary embodiments of the present invention have been hereinbefore described, they are not to be construed as limiting thereof. Thus, those skilled in the art will readily appreciate that various modifications are possible. For example, the present invention is not limited to such an embodiment that the metal powder is used in the metal laser-sintering/milling hybrid machine (wherein three-dimensional shaped object is produced by repeating the sintered layer forming step and the removing step). The metal powder of the present invention may be used in another metal laser-sintering process in which the surface of the shaped object is machined after the whole of three-dimensional shaped object is completely formed by a metal laser-sintering.

It should be noted that the present invention as described above includes the following aspects:

The first aspect: A metal powder for use in metal laser-sintering wherein a three-dimensional shaped object is fabricated by irradiating a powder layer of the metal powder with a light beam (optical beam) to form a sintered layer, and thereby laminating the sintered layers; characterized in that the metal powder comprises an iron-based powder and at least one kind of powder selected from the group consisting of a nickel powder, a nickel-based alloy powder, a copper powder, a copper-based alloy powder and a graphite powder; and the iron-based powder has been annealed.

The second aspect: The metal powder for use in metal laser-sintering according to the first aspect, characterized in that the metal powder comprises a mixture of the iron-based powder and at least one kind of powder selected from the group consisting of the nickel powder, the nickel-based alloy powder, the copper powder, the copper-based alloy powder and the graphite powder.

The third aspect: The metal powder for use in metal laser-sintering according to the first or the second aspect, characterized in that the metal powder comprises:

the iron-based powder;

at least one of the nickel powder and the nickel-based alloy powder;

at least one of the copper powder and the copper-based alloy powder; and the graphite powder.

The fourth aspect: The metal powder for use in metal laser-sintering according to any one of the first to the third aspects, characterized in that the iron-based powder has been annealed by allowing it to stand at a temperature of from 600 to 700° C. under a reduced pressure, a vacuum or an inert atmosphere, followed by a slow cooling thereof.

The fifth aspect: The metal powder for use in metal laser-sintering according to the fourth aspect, characterized in that a mean particle diameter of the iron-based powder is in the range of from 5 to 50 μm.

The sixth aspect: The metal powder for use in metal laser-sintering according to any one of the first to the fifth aspects, characterized in that an atomized iron-based powder has been annealed.

The seventh aspect: A metal laser-sintering process for fabricating a three-dimensional shaped object by repeating the steps of:

irradiating a powder layer of the metal powder according to any one of the first to sixth aspects with a light beam to form a sintered layer; and machining a surface portion of the laminated sintered layers and/or removing an unnecessary portion of the laminated sintered layers.

EXAMPLES

An annealing treatment of an iron-based powder used as a raw powder of the metal powder for metal-laser sintering was performed. In this treatment, the annealing conditions were studied for the following reasons:

When the iron-based powder is heated, the surfaces of powder particles are activated, and thus mutual contacting portions of such particles turn into more stable shape. Namely, the metal atoms of the particles are caused to move in such directions that the surface area of the particles becomes smaller, and thereby there is occurred a sintering phenomenon allowing the powder particles to unite with each other. The smaller particle diameter of the powder provides the larger surface area of the powder, causing the sintering phenomenon to proceed at a lower temperature due to a larger contacting surface between the particles. Also, a higher temperature of the heating induces an occurrence of the sintering phenomenon. Accordingly, in a case of the powder with a large contact area, it is necessary to carry out the annealing treatment at a temperature lower than a conventional annealing temperature of the ordinary ingots (i.e. metal products obtained from the molten metal).

Specifically, the annealing conditions were studied by changing an annealing temperature and an atmosphere respectively. As the iron-based powder, a chromium-molybdenum steel powder (SCM 440) with a mean particle diameter of 20 μm was used. Such chromium-molybdenum steel powder had been prepared by a water atomization process suitable for mass production. Thus, the chromium-molybdenum steel powder had a very high hardness as a quenched microstructure had been formed therein due to a very high cooling rate upon the preparation thereof.

Such chromium-molybdenum steel powder was spread over a pallet made of stainless steel, and then was annealed in an annealing furnace at the temperature conditions of 1000° C., 800° C. and 650° C. respectively. As for the atmosphere condition, an air atmosphere, a vacuum atmosphere (about 100 Pa) and a reductive atmosphere were respectively used. The results show that the adjacent particles were fused with each other at 1000° C. and 800° C. upon the annealing, in which case such fused particles were hard to divide into smaller ones having the original powder form. In particular, such fused particles were remarkably observed in the case of the powder annealed at 1000° C. While on the other hand, in the case of the powder annealed at 650° C. whose particles had been fused with each other to some extent, it was possible to divide the fused particles into smaller ones having original powder form by crushing them on a sieve.

In the light of not only the above results but also the fact that an iron cannot be sufficiently annealed at the temperature of less than and equal to 580° C., it was concluded that an optimum heating temperature for the annealing of the iron-based powder was in a range from 600° C. to 700° C.

With regard to the annealing atmosphere condition, a good result was obtained in the case of the annealing at 650° C. under the vacuum atmosphere. While in the case of the annealing under the air atmosphere, a significant surface oxidation was observed in the annealed powder. Also, in the case of the annealing under the reductive atmosphere, the adjacent particles were fused together, making it impossible to use them for the metal laser-sintering. For these reasons, it was concluded that a preferable annealing condition was the vacuum or reduced pressure atmosphere wherein the iron-based powder does not react with the atmosphere, or the inert atmosphere such as argon gas atmosphere or nitrogen gas atmosphere.

Next, a comparative testing on a surface machinability for the shaped object was carried out by using the following two kinds of metal powders in the metal laser sintering/milling hybrid machine 1 (e.g. LUMEX 25C manufactured by Matsuura Machinery Co., Ltd.) as shown in FIG. 1:

Metal powder for metal laser sintering wherein chromium-molybdenum steel powder that had been annealed at 650° C. under the vacuum atmosphere was contained; and Metal powder for metal laser sintering wherein no-annealed chromium-molybdenum steel powder was contained.

Figure 4:
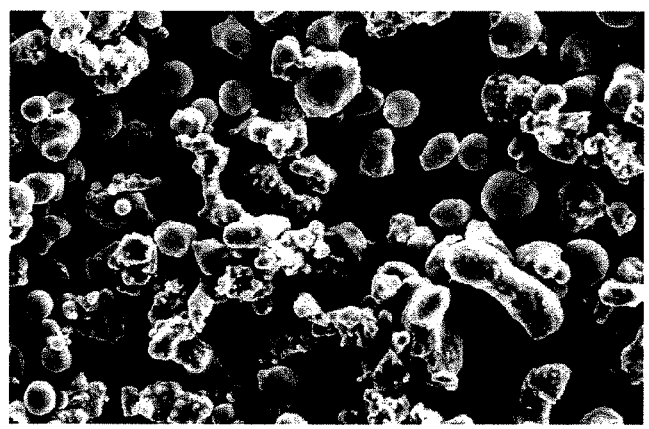
FIG. 4 is a SEM photograph of a chromium-molybdenum steel powder that is contained in a metal powder for metal laser-sintering according to the present invention.
Figure 5:
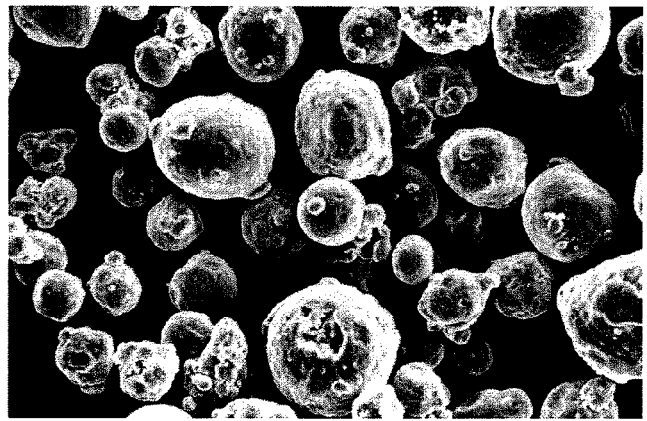
FIG. 5 is a SEM photograph of nickel powder that is contained in a metal powder for metal laser-sintering according to the present invention.
Figure 6:
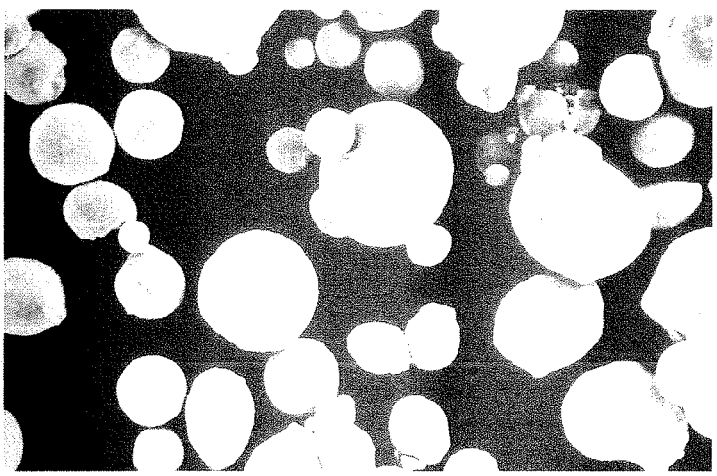
FIG. 6 is a SEM photograph of copper-manganese alloy powder that is contained in a metal powder for metal laser-sintering according to the present invention.
Figure 7:
FIG. 7 is a SEM photograph of a flaky graphite powder that is contained in a metal powder for metal laser-sintering according to the present invention.
Figure 8:
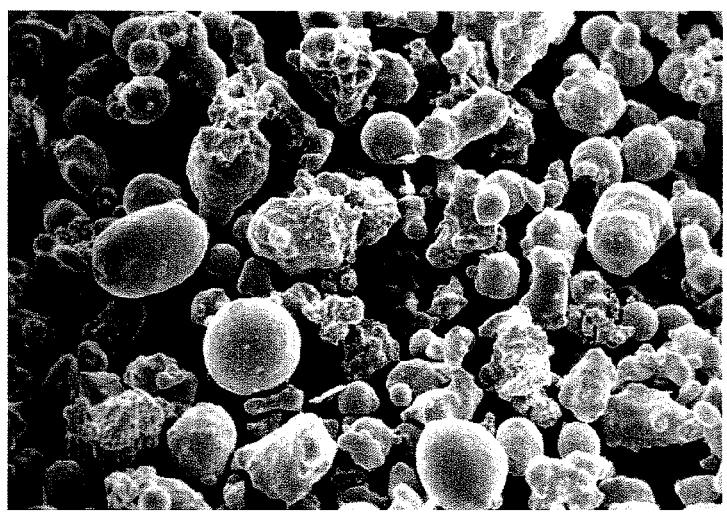
FIG. 8 is a SEM photograph of a metal powder for metal laser-sintering according to the present invention (with constituent powders mixed therein).

In addition to the chromium-molybdenum steel powder, a nickel (Ni) powder with a mean particle diameter of 30 μm, a copper-manganese alloy (CuMnNi) powder with a mean particle diameter of 30 μm and a flaky graphite (C) powder were contained in each of the above two kinds of metal powder. The blending proportion in each metal powder was as follows: 70% by weight for SCM 440, 20% by weight for Ni, 9% by weight for CuMnNi and 0.3% by weight for C. As to the constituent powders, FIG. 4 shows a SEM photograph of the chromium-molybdenum steel powder that has been annealed at 650° C. under the vacuum atmosphere. FIG. 5 shows a SEM photograph of the nickel powder. FIG. 6 shows a SEM photograph of the copper-manganese alloy powder. FIG. 7 shows a SEM photograph of the flaky graphite powder. FIG. 8 shows a SEM photograph of the metal powder obtained by mixing the constituent powders with each other.

In the metal laser-sintering/milling hybrid process, a carbon dioxide gas laser was used as a light beam L, and a set value for a thickness Δt1 of the powder layer 22 was 0.05 mm. Upon milling, a tool (ball end mill) equipped with a milling head 40 having a diameter of 0.6 mm (effective milling length: 1 mm) was used. In this regard, a removing means 4 was actuated at the time point when the 10-layered sintered layers 24 with the thickness of 0.5 mm were formed.

The results showed that the metal powder containing the annealed chromium-molybdenum steel powder provided a more improved machinability than that of the metal powder containing the no-annealed chromium-molybdenum steel powder. Specifically, the lifetime of the tool as in the case of the annealed powder was about 1.5 times as long as that of the no-annealed powder. It is supposed that the improved lifetime of the tool as in the case of the annealed powder results from the fact that the residual chromium-molybdenum steel powder adherent to the surface of the shaped object was in a softened state due to the annealing treatment.

As described above, the inventors of the present application had found out the annealing conditions for the iron-based powder having the particle diameter of 20 μm. With the use of the metal powder containing the iron-based powder that had been annealed under such conditions, the inventors were able to carry out the metal laser-sintering process. As a result, the three-dimensional shaped object with high density, high strength and high hardness was obtained. And also, the surface machinability for the shaped object thus obtained was improved so that the lifetime of the machining tool was extended.

While the annealing conditions for the iron-based powder were studied on the metal powder with the blending proportion of 70% by weight for SCM 440, 20% by weight for Ni, 9% by weight for CuMnNi and 0.3% by weight for C, it should be noted that the improved machinability for the surface of the shaped object, which is attributable to the annealing treatment, is not particularly subject to the powder composition except for the annealed iron-based powder. Accordingly, any suitable metal powders are effective for metal laser-sintering as long as they contain the annealed iron-based powder.

INDUSTRIAL APPLICABILITY

The use of the metal powder according to the present invention in the metal laser-sintering process makes it possible to manufacture a three-dimensional shaped object such as metal mold for plastic injection molding, press die, die-casting die, casting die and forging die.

CROSS REFERENCE TO RELATED PATENT APPLICATION

The present application claims the right of priority of Japanese Patent Application No. 2006-230291 (filed on Aug. 28, 2006, the title of the invention: "METAL POWDER FOR METAL LASER-SINTERING"), the disclosure of which is incorporated herein by reference.

The invention claimed is:

1. A metal laser-sintering process for producing a three-dimensional shaped object by repeating the steps of:

irradiating a powder layer of a metal powder with a light beam to form a sintered layer, and thereby laminating the sintered layers, wherein the metal powder comprises an iron-based powder and at least one kind of powder selected from the group consisting of a nickel powder, a nickel-based alloy powder, a copper powder, a copper-based alloy powder and a graphite powder, a mean particle diameter of the iron-based powder being in the range of from 5 to 50 μm; and the iron-based powder has been annealed at an annealing temperature in the range from 600-700° C.; and machining a surface portion of the laminated sintered layers and/or removing an unnecessary portion of the laminated sintered layers.

2. A metal powder for use in metal laser-sintering wherein a three-dimensional shaped object is produced by irradiating a powder layer of the metal powder with a light beam to form a sintered layer, and thereby laminating the sintered layers, and wherein a surface of the produced three-dimensional shaped object is subjected to a finish machining; wherein the metal powder comprises an iron-based powder and at least one kind of powder selected from the group consisting of a nickel powder, a nickel-based alloy powder, a copper powder, a copper-based alloy powder and a graphite powder, a mean particle diameter of the iron-based powder being in the range of from 5 to 50 µm; and the iron-based powder has been annealed at an annealing temperature in the range from 600-700° C.

3. The metal powder for use in metal laser-sintering according to claim 1, characterized in that
the metal powder comprises:
the iron-based powder;
at least one of the nickel powder and the nickel-based alloy powder;
at least one of the copper powder and the copper-based alloy powder; and
the graphite powder.

4. The metal powder for use in metal laser-sintering according to claim 1, characterized in that
the iron-based powder has been annealed by allowing it to stand at a temperature of from 600 to 700° C. under a reduced pressure, a vacuum or an inert atmosphere, followed by a slow cooling thereof.

5. The metal powder for use in metal laser-sintering according to claim 1, characterized in that an atomized iron-based powder has been annealed.

* * * * *